United States Patent [19]

Ritter

[11] 3,889,248

[45] June 10, 1975

[54] FAULTY BATTERY CONNECTION INDICATOR

[75] Inventor: Herbert W. Ritter, Alamo, Calif.

[73] Assignee: Esther Ritter, Santa Clara, Calif.

[22] Filed: May 21, 1973

[21] Appl. No.: 361,864

Related U.S. Application Data

[63] Continuation of Ser. No. 6,442, Jan. 28, 1970, abandoned.

[52] U.S. Cl. ............................... 340/249; 340/256
[51] Int. Cl. .......................................... G08b 21/00
[58] Field of Search .......... 340/248, 250, 253, 256, 340/249; 324/28, 28 CR, 51, 64, 65; 339/273; 337/265

[56] References Cited
UNITED STATES PATENTS

| 740,745 | 10/1903 | Erikson | 337/265 |
| 1,716,326 | 6/1929 | Schlatter | 339/273 X |
| 2,289,187 | 7/1942 | Gardner | 324/51 |
| 2,702,329 | 2/1955 | Dietz, Jr. et al. | 337/265 |

FOREIGN PATENTS OR APPLICATIONS

| 738,192 | 10/1955 | United Kingdom | 324/51 |

*Primary Examiner*—John W. Caldwell
*Assistant Examiner*—Daniel Myer
*Attorney, Agent, or Firm*—Irwin P. Garfinkle

[57] ABSTRACT

A faulty connection betwen the terminal post of a battery and the cable connector clamp is determined by means of an indicator connected across the connection. The indicator may take the form of a lamp, a fuse, or any other device which serves to indicate current flow.

4 Claims, 2 Drawing Figures

PATENTED JUN 10 1975  3,889,248

INVENTOR.
HERBERT W. RITTER
BY
*Henri P. Canfield*
ATTORNEY.

FAULTY BATTERY CONNECTION INDICATOR

This is a continuation of application Ser. No. 6,442 filed 1-28-74, now abandoned.

A very frequent problem in the operation of a conventional motor vehicle is the failure of the starter due to faulty connections between the battery terminals and the cable connectors. Corrosion of the terminal posts, improperly cleaned terminals, or loose connectors may not carry sufficient current to the engine starter, or other accessories, but very often these symptoms are diagnosed as a run-down or defective battery requiring service or replacement. The object of the present invention is to provide a simple, inexpensive, essentially foolproof system for providing an instantaneous and certain indication of such a problem.

Figure 1:
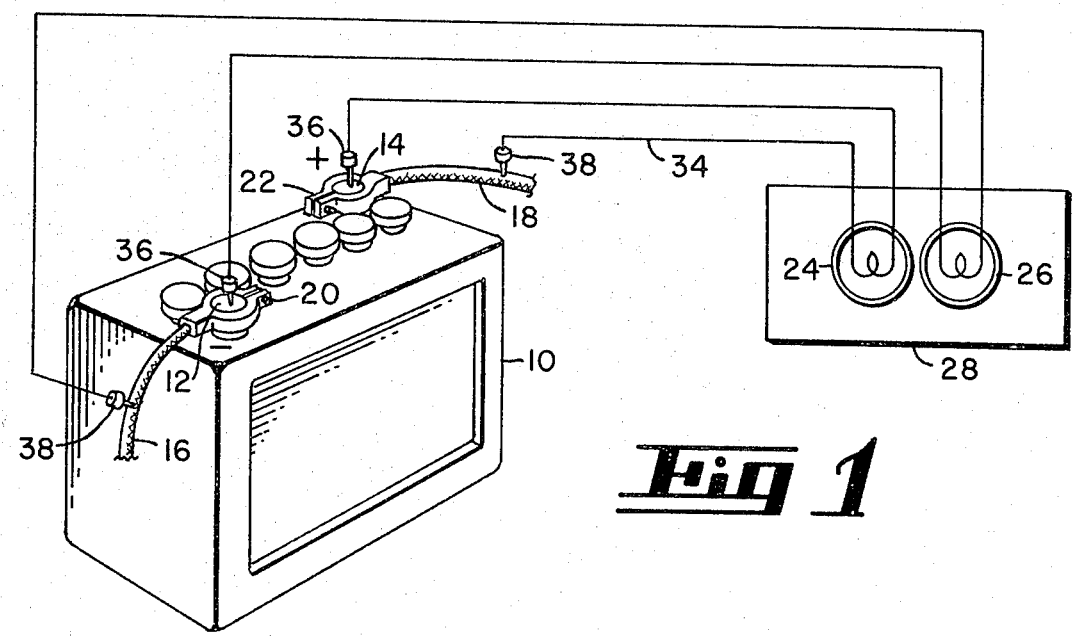
Figure 2:
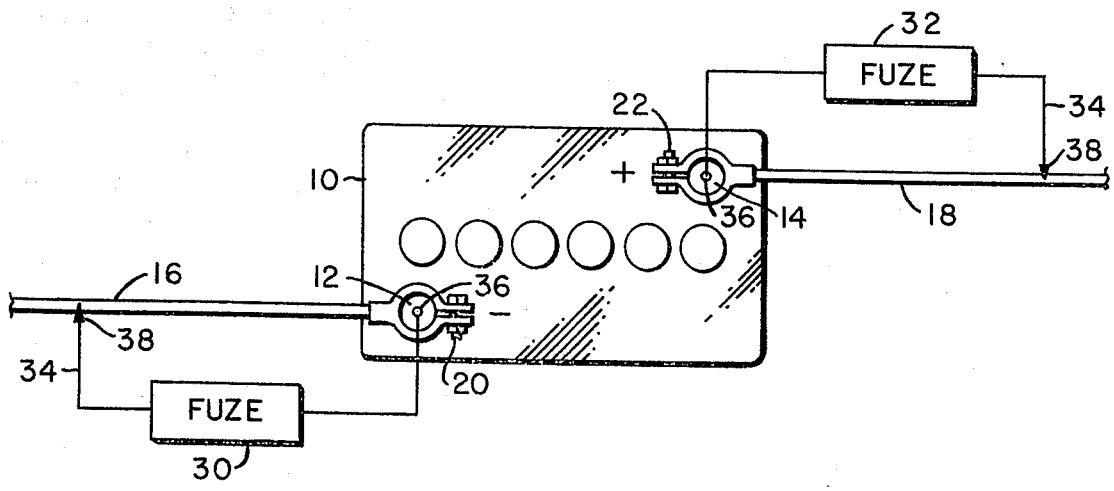

For further objects and a better understanding of the invention, reference is now made to the following specification and drawings in which:

FIG. 1 is an embodiment of this invention utilizing dashboard-mounted lamps and an indicator; and FIG. 2 is an embodiment of this invention utilzing fuses connected at the battery.

Referring to FIGS. 1 and 2, a conventional rechargeable wet cell battery 10, commonly used in automobiles, is provided with terminal posts 12 and 14. Connections to the various automobile accessories (not shown) are made through cables 16 and 18, by means of clamps 20 and 22, connected to the posts 12 and 14, respectively.

In the normal use of the automobile, heavy deposits accumulate on the clamps and posts and quite frequently these deposits break the connection or at least greatly increase the impedance between the posts and the clamps. As previously noted, this results in starter or other accessory failure, in decreased battery performance suggesting the need for battery replacement.

In the embodiment of FIG. 1, I provide the indication of a faulty connection by means of warning lamps 24 and 26, preferably mounted in the automobile dashboard 28. In the embodiment of FIG. 2, the fault is indicated by means of fuses 30 and 32 connected at the batteries. In each case, the lamps and fuses are connected across the battery terminal connections by means of conductors 34 connected to the battery terminal by means of pins 36 and to the cables 16 and 18 by means of pins 38.

In normal operation, the fuses or lamps are short-circuited by the normal connections between the posts and cables. However, if these connections are broken, or if the impedance of the connection is increased, current will flow through the lamps and fuses. In the first case, the indication of a deteriorated or faulty connection is indicated by a warning light in the automobile. In the latter case the fault is indicated by a blown fuse located at the battery. In both cases the fault can then be corrected without extensive testing.

It is apparent that various modifications and adaptations of this invention are available to persons skilled in the art without departing from the spirit and scope of this invention. For example, while I have illustrated and described circuits using fuses and lamps as indicators, other indicating arrangements may also be used, such as chemicals which change color as a result of the flow of electricity therethrough, a resettable circuit breaker, a dashboard-mounted ammeter, or a relay.

I claim:

1. The combination comprising:
   an automobile-type wet cell battery having first and second terminal posts;
   first and second insulated cables, one for each of said first and second posts, respectively;
   first and second clamps, said first clamp being electrically connected to said first cable and being clamped to said first post, said second clamp being electrically connected to said second cable and being clamped to said second post, whereby first and second normally low impedance electrical connections between said first cable and said first post, and between said second cable and said second post are completed;
   first and second two-terminal indicators, one for each of said first and second low impedance electrical connections, respectively, for indicating the condition of each of said first and second normally low impedance electrical connections;
   first connecting means for connecting said first two-terminal indicator in parallel with said first normally low impedance electrical connection, said first means comprising a first electrical connection connected directly between one terminal of said first indicator and said first terminal post, and a second electrical connector connected directly between the other terminal of said indicator and said first cable;
   second connecting means for connecting said second two-terminal indicator in parallel with said second normally low impedance electrical connection, said second means comprising a first electrical connector connected directly between one terminal of said second indicator and said second terminal post and a second electrical connector connected directly between the other terminal of said indicator and said second cable;
   whereby said first and second indicators are short-circuited by the normally low impedances of the respective normally low impedance electrical connection, said indicators being in the current path of said battery when the normally low impedance of the respective electrical connections increase, the change of state of said indicator due to current flow therethrough indicating said increase in impedance.

2. The invention as defined in claim 1 wherein said first and second connectors of said first and second connecting means are pins, said first pins being driven into a respective terminal post of said battery, said second pins being driven into a respective cable through the insulation thereof.

3. The invention as defined in claim 2 wherein said indicator is a fuse, the blowing of said fuse indicating the presence of a faulty connection.

4. The invention as defined in claim 2 wherein said indicator is a lamp, the lighting of said lamp indicating the presence of a faulty connection.

* * * * *